United States Patent
Roberts

(10) Patent No.: US 9,913,703 B2
(45) Date of Patent: Mar. 13, 2018

(54) OESTRUS DETECTOR

(71) Applicant: Beacon Automation Pty Limited, Tullamarine, Victoria (AU)

(72) Inventor: Jock McDonald Roberts, Muswellbrook (AU)

(73) Assignee: BEACON AUTOMATION PTY LIMITED, Tullamarine (AT)

( * ) Notice: Subject to any disclaimer, the term of this patent is extended or adjusted under 35 U.S.C. 154(b) by 0 days.

(21) Appl. No.: 15/240,333

(22) Filed: Aug. 18, 2016

(65) Prior Publication Data
US 2016/0354190 A1    Dec. 8, 2016

Related U.S. Application Data

(63) Continuation of application No. 14/685,052, filed on Apr. 13, 2015, now abandoned, which is a continuation of application No. 13/512,650, filed as application No. PCT/AU2010/001610 on Nov. 30, 2010, now Pat. No. 9,034,276.

(30) Foreign Application Priority Data

Dec. 1, 2009    (AU) .................................. 2009905866

(51) Int. Cl.
*A61D 17/00*    (2006.01)
*A01K 29/00*    (2006.01)
*A01K 21/00*    (2006.01)
*B01L 3/00*    (2006.01)

(52) U.S. Cl.
CPC ............ *A61D 17/002* (2013.01); *A01K 21/00* (2013.01); *A01K 29/005* (2013.01); *B01L 3/5023* (2013.01); *B01L 2200/141* (2013.01); *B01L 2400/0481* (2013.01)

(58) Field of Classification Search
None
See application file for complete search history.

(56) References Cited

U.S. PATENT DOCUMENTS

| | | |
|---|---|---|
| 3,036,894 A | 5/1962 | Forestiere |
| 3,076,431 A | 2/1963 | Rule et al. |
| 3,205,857 A | 9/1965 | Larson |
| 3,713,779 A * | 1/1973 | Sirago ..................... B01L 3/502 206/219 |
| 3,942,475 A | 3/1976 | Wassilieff et al. |
| 7,223,364 B1 | 5/2007 | Johnston et al. |
| 9,034,276 B2 | 5/2015 | McDonald Roberts |
| 2012/0244039 A1 | 9/2012 | Roberts |

\* cited by examiner

*Primary Examiner* — Jill A Warden
*Assistant Examiner* — Julie L Tavares
(74) *Attorney, Agent, or Firm* — Gordon & Jacobson, P.C.

(57) ABSTRACT

An oestrus detector includes a reservoir portion which contains a coloured liquid. The detector further includes a generally planar portion that is attached to and sealed from the reservoir portion, except for an open or closed passage in a seal line separating the reservoir portion and the generally planar portion. In use the liquid is squeezed from the reservoir portion, through the passage, and into the generally planar portion, when the reservoir portion receives pressure.

22 Claims, 9 Drawing Sheets

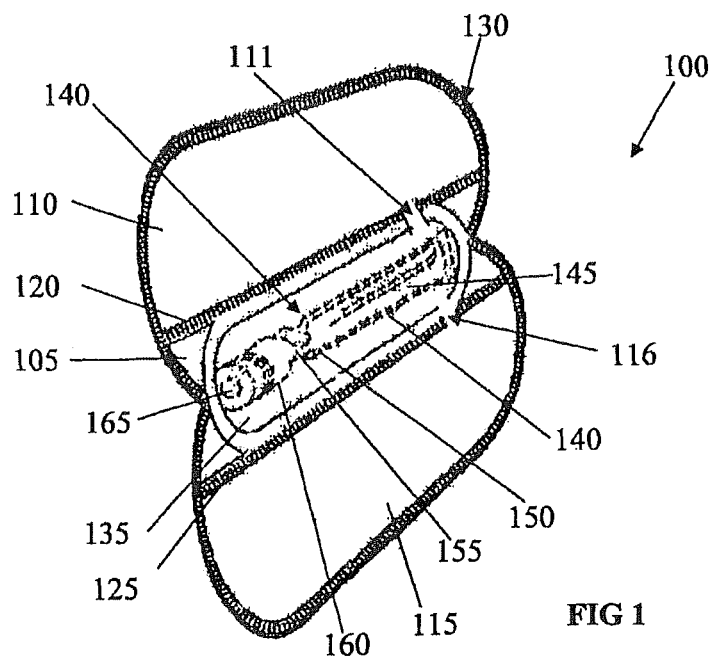
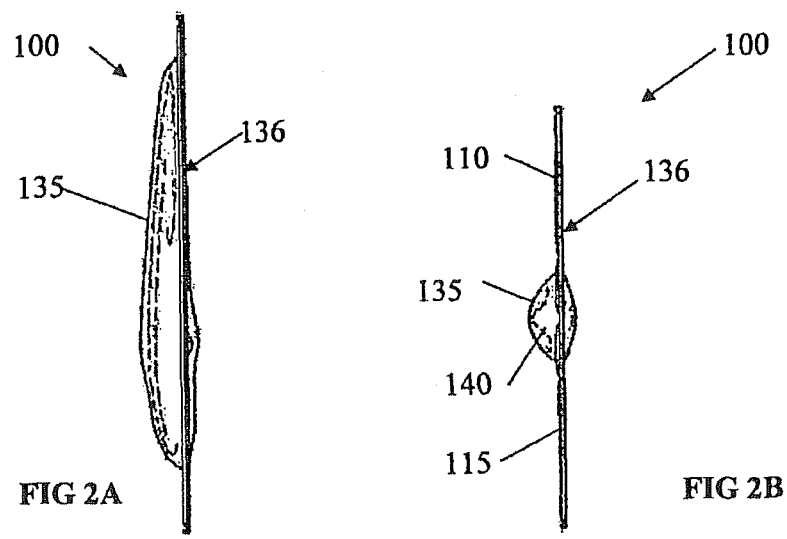

ESTRUS DETECTOR
COWS AND HORSES

FIG 6

ESTRUS DETECTOR
COWS AND HORSES

FIG 7

ESTRUS DETECTOR
COWS AND HORSES

FIG 8

OESTRUS DETECTOR

CROSS-REFERENCE TO RELATED APPLICATIONS

This application is a continuation of U.S. patent application Ser. No. 14/685,052, filed on Apr. 13, 2015, which is a continuation of U.S. patent application Ser. No. 13/512,650, filed on May 30, 2012, and now issued as U.S. Pat. No. 9,034,276, which claims priority from PCT/AU/2010/001610 filed on Nov. 30, 2010, and AU 2009905866 filed on Dec. 1, 2009, all of which are hereby incorporated by reference in their entireties.

BACKGROUND

Field

The present invention relates to devices for detecting oestrus in animals.

Related Art

Animals, such as horses or cows, are reproductively active when they undergo their oestrus cycles. Detection of the occurrence of oestrus enables animal farmers to optimise their breeding programs.

One behavioural indicator of oestrus is increased physical activity in the animals, most notably leading to an increased frequency of mounting between animals. An animal in heat will also allow itself to be mounted by other animals.

Any reference herein to known prior art does not, unless the contrary indication appears, constitute an admission that such prior art is commonly known by those skilled in the art to which the invention relates, at the priority date of this application.

SUMMARY

The present invention provides an oestrus detector, including a reservoir portion which contains a flowable substance; and at least one generally planar portion that is attached to and sealed from the reservoir portion, except for an open or closed passage in a seal line separating the reservoir portion and the at least one generally planar portion, wherein in use, a pressure upon the reservoir portion causes the flowable substance to be squeezed through the passage and into the at least one generally planar portion.

The oestrus detector can have a plurality of generally planar portions.

There can be two generally planar portions, the second generally planar portion being attached to and sealed from the reservoir portion, except for a second open or closed passage in a second seal line separating the reservoir portion and the second generally planar portion.

The generally planar portions can be located on opposite sides of the reservoir portion.

The passage and the second passage can be both located on or near one end of the reservoir portion.

The oestrus detector can further include a vial for holding the flowable substance, the vial being located inside the reservoir portion.

The vial can be closed by a valve head having a vial head opening, and in use, the flowable substance is squeezed through the valve head opening by pressure.

The passage in the seal line can be located near or at an end of the reservoir portion so as to be away from the valve head opening.

The generally planar portion can include one or more internal seal lines.

The one or more internal seal lines can form a text or graphic on the generally planar portion.

The one or more internal seal lines can form an internal pathway for the flowable substance to travel inside the generally planar portion.

The internal pathway can be adapted to facilitate a generally incremental spreading of the flowable substance inside generally planar portion.

The internal pathway can include a series of compartments that are generally separated from each other by the internal seal lines.

The plurality of generally planar portions can each have one or more internal seal lines.

The one or more internal seal lines in the plurality of generally planar portions can be the same as those in the at least one generally planar portion.

The reservoir portion and the at least one generally planar portion can be lined with a fibrous material.

The fibrous material can be a synthetic short fibre material.

The fibrous material can be hydrophobic.

The fibrous material can be hydrophilic.

The flowable substance can cause a material contained in the generally planar portion to change colour via a physical or a chemical reaction.

A pathway of the flowable substance through the detector can lead from the reservoir portion and to each of the plurality of generally planar portions in sequence.

The joins on interfaces between the reservoir portion and the at least one generally planar portion allows the detector to follow the contour of an animal's body portion which will receive the device.

The passage can be closed by a valve that is openable by pressure, or a frangible means that can be broken by pressure.

The second passage can be also closed by a valve that is openable by pressure, or a frangible means that can be broken by pressure.

The flowable substance can be a liquid or can be one of or a mixture of two or more of the following: a gel, a paste, a jelly, a cream, a slurry, a liquid of high, medium or low viscosity, a flowable powder.

BRIEF DESCRIPTION OF THE DRAWINGS

An embodiment or embodiments of the present invention will now be described, by way of example only, with reference to the accompanying drawings.

FIG. 1 is a perspective view of a device for detecting oestrus.

FIG. 2A is a side elevational view of the device depicted in FIG. 1.

FIG. 2B is an end elevational view of the device depicted in FIG. 1.

FIG. 6 is a plan view of a generally planar portion according to a further embodiment of the device for detecting oestrus.

FIG. 7 is a plan view of a generally planar portion according to a further embodiment of the device for detecting oestrus.

FIG. 8 is a plan view of a generally planar portion of a further embodiment of the device for detecting oestrus.

DETAILED DESCRIPTION OF THE EMBODIMENT OR EMBODIMENTS

Figure 3:
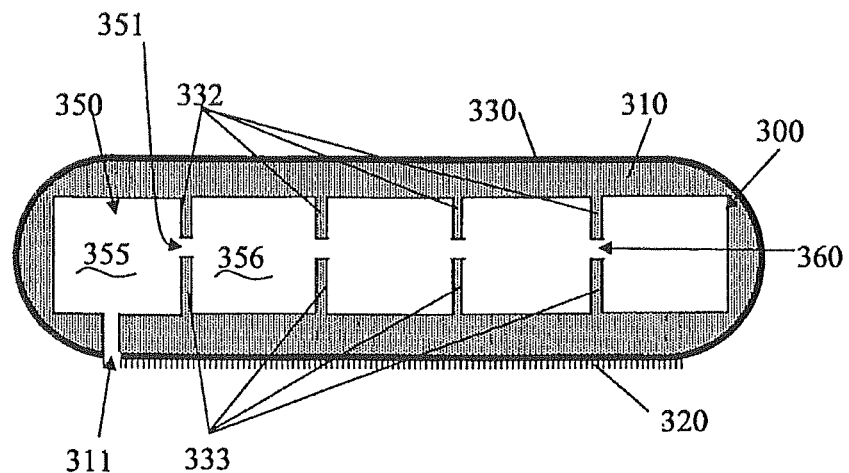
FIG. 3 is a plan view of a generally planar portion according to one embodiment of the device for detecting oestrus.

FIG. 1 shows a detection device 100 for detecting oestrus. The device 100 includes a central portion 105, and generally planar portions or flaps 110, 115 which are located on opposite sides of the central portion 105. The generally planar portions 110, 115 are separated from the central portion 105 by seal lines 120 and 125. The seal lines 120 and 125 completely seal the central portion 105 from the generally planar portions 110 and 115, except at passages 111 and 116 as described below. The entire device 100 is also sealed along its perimeter 130. The sealing of the perimeter 130, as well as the sealing of the central portion 105 from the generally planar portions 110 and 115 can be done by heat welding. This can be also achieved by another suitable method, such as gluing, sonic welding etc.

The central portion 105 also includes a reservoir portion 135. Alternatively the central portion 105 itself can function as the reservoir portion. The central portion 105 or liquid reservoir portion 135 contains a vial 140 which holds a liquid. The vial 140 includes a receptacle 145 for the dye, the receptacle 145 being closed by an openable valve 150. The valve 150 is located between the receptacle 145 and a vial head 160. The valve 150 almost completely closes the receptacle 145, except for a narrow channel 155 which opens from the receptacle 145, extends through the valve 150, and leads into an opening 165 in the vial head 160. The vial 140 can be e.g. made of plastic or other polymeric material and have a compressable portion, to allow the dye to be squeezed out. Alternatively, the vial 140 can be frangible, e.g. made of glass, so that it breaks upon the application of a pressure, causing the dye to exit the vial.

In some variations (e.g. as described below with respect to FIGS. 12 to 16), the reservoir portion 135 can be located on the side, instead of being centrally located. Further, the liquid can be directly contained in the reservoir portion 135, rather than in a vial 140 that is located inside the reservoir portion 135.

The device 100 is attached to the animal by adhesive or other means, such that the central portion 105 can receive a pressure when the animal is mounted by another animal, so that the pressure causes the liquid to exit the vial 140 and do one or more of the following: a) completely fill or stain or colour or affect the central portion, and once this has been done the liquid and or dye can flow to the planar portions and stain, colour or affect the whole of these, b) flow to the planar portions 110 and 115 and stain colour or affect the whole of these portions.

For instance, the device 100 is attached so that the central portion 105 is located over the rump or over the spine at the rear end of an animal. When the animal to which the device has been attached is mounted by another animal, the pressure created by the mounting causes the dye inside the receptacle 145 to be squeezed through the channel 155 in the valve 150, and out of the vial 140 through the valve head opening 165. The dye then fills the reservoir portion 135. Farmers can therefore detect oestrus activities amongst the animals by examining the device 100 to see if the dye has left the vial. Either or both side portions may have printing or weld lines which depict information such as the type of animal that the device 100 is suitable for, or a batch number for the device, etc.

So that the dye is more readily visible through the device 100, the device 100, particularly the central portion 105 or the reservoir portion 135 is made using a leakage proof material such as clear PVC. However other material can be used as long as the dye is visible through the material, or the effect of the dye is visible through the material, and as long as the material is appropriately waterproof so that the dye does not seep through the material. To facilitate the spreading of the dye inside the reservoir portion 135 and generally planar portions 110 and 115, the reservoir portion can be lined with a fibre, e.g. a flock layer. For instance this can be a cotton fibre, or a rayon synthetic short fibre. The fibre can be either attached to the PVC material, or can be sandwiched between the PVC material that forms the reservoir portion 135. Different types of fibre can be used. For instance the fibre can be hydrophobic, and the dye will tend to spread through the fibre by travelling in the interstices between the fibres. Alternatively the fibre can be hydrophilic, in which case the dye will spread through being absorbed by the fibre.

The liquid contained in the reservoir portion can be a dye, such as a brightly coloured dye. Alternatively it can be another coloured or colourless liquid, which causes a material within the generally planar portion to change colour, either by being dyed or via another physical or chemical reaction. For example the liquid can be acidic or basic, and the material in the generally planar portion can have the qualities of a litmus paper. The material may be of a kind that changes colour when it becomes wet, in which case the liquid used can be water. The material itself may be a liquid, which changes colour when it comes into contact with the liquid contained in the reservoir portion via a physical reaction, such as diffusion, or a chemical reaction. The generally planar portion can be perceived as becoming darker in colour as pressure is repeatedly applied to the liquid reservoir. For instance, if the generally planar portion can hold a material that becomes darker in colour because as pressure is repeatedly applied, more liquid from the liquid reservoir becomes available to react chemically with the material.

The rate at which the dye is squeezed out of the vial 140 is controlled by factors such as the amount of pressure upon the reservoir portion 135, the length of time that the pressure is applied, the size of the channel 155 in the valve 150, and by the type of fibre that is used to line the reservoir portion 135.

If a large enough pressure is created during oestrus, and if the pressure if applied for a long enough length of time, the dye can completely fill the reservoir portion when the animal to which the device 100 is attached is mounted only once. Also, in some cases the dye can be squeezed out of the vial 140 by accident, for example, when the animal bumps into another animal or scratches itself on a tree.

As shown in FIGS. 2A and 2B, the device 100 can be asymmetrical. The central portion 105 and hence the reservoir portion 135 can protrude more out of one face of the device 100 than the other. This arrangement presents the vial 140 more prominently when the device 100 is attached to an animal, so that the vial 140 is more likely to receive pressure during oestrus. The back face 136 of the device can include an adhesive so that the device 100 is self adhesive. A self adhesive device includes a backing or a release liner that is located over the adhesive and peeled away before the device is used. The device 100 can alternatively be glued onto the animal.

The seal lines 120 and 125 can be provided such that the generally planar portions 110 and 115 fold toward the protruded reservoir portion 135 more easily compared to the folding of the flaps in the opposite direction. The arrangement can facilitate the attachment of the device 100 to the hindquarters of the animal and further helps better present the reservoir portion to receive impact. The interface region between the reservoir portion 135 and the generally planar portions 110 and 115 can also be adapted to follow the contour of the animal's body portion which will receive the detector.

The dye containing portion 105 is not completely sealed from the planar portions 110 and 115. Openings or open passages 111 and 116 through the seal lines 120 and 125 enables communication between the reservoir portion 135 and the space in the generally planar portions 110 and 115.

When pressure is applied to the vial 140 inside the reservoir portion 135, the dye is squeezed out of the vial. Once the dye enters the reservoir portion 135, it can now further flow towards the generally planar portions 110 and 115. The rate at which the dye travels from the reservoir portion 135 to generally planar portions 110 and 115 is controlled by the size of the openings 111 and 116 in the weld lines 120 and 125. The narrower the openings 111 and 116, the more slowly the dye travels from the reservoir portion 135 to the space in the generally planar portions 110 and 115.

The inside of the generally planar portions 110 and 115 can also be lined with a fibrous material which facilitates the spreading of the dye in the generally planar portions 110 and 115. Furthermore, the openings 111 and 116 are only located on one end of the seal lines 120 and 125. The dye is therefore limited to spreading into one end of the generally planar portions 110 and 115 from the reservoir portion 135, and gradually spreading throughout the generally planar portions 110 and 115. If desired, there can be multiple openings on each seal line 120 or 125. If desired, these can be located nearer one end of the seal line 120 or 125 than the opposite end, so as to further enable the gradual spreading. Alternatively as in FIGS. 10, 11 and 12 multiple passages from the reservoir portion lead into the generally planar portions.

In FIG. 1 the openings 111 and 116 are shown to be provided so that they are both located near the end of the reservoir portion 135 that is away from the opening 165 for the vial 140. This location helps slow down the spread of the dye through out the device 100 as the dye would first need to travel through the length of the reservoir portion 135 before reaching the openings 111 and 116. Therefore this arrangement also facilitates the incremental usage of the device, i.e. incremental spreading of the dye.

This incremental spread of the dye through the reservoir portion 135, and/or the generally planar portions 110 and 115, helps farmers or breeders to tell the extent to which there has been mounting activity, i.e. if the animal has been mounted only once or multiple times, by inspecting the extent to which the dye has spread through the generally planar portions 110 and 115. The incremental spread can also help farmers or breeders to determine whether the leakage of the dye out of the vial is not oestrus related or has been caused by oestrus, as 'accidental' impact is not likely to happen as often as an oestrus related mounting.

For animals whose oestrus activities are less forceful, the arrangements of seal lines and/or openings which contribute to incremental spreading of the dye can be modified so that the breeders can tell when oestrus has occurred in a timely fashion. For example the openings 311 can be larger or there can be more openings, or they can be located closer to the vial opening.

The generally planar portions 110 and 115 can also have internal seal lines to further restrict the spread of the dye within the generally planar portions 110 and 115. The seal lines within the generally planar portions 110 and 115 thereby define a pathway through which the dye may travel through the generally planar portion.

FIG. 3 depicts one example of such a pathway 300. In addition to being sealed around the outer perimeter 330, the generally planar portion 310 has internal seal lines 332, e.g. weld lines which extend from the perimeter 330. The planar portion 310 also has seal lines 333 which extend from the seal line 320 between the central portion and the generally planar portion 310. The internal seal lines 332 and 333 are distributed at intervals throughout the length of the generally planar portion 310. In this example the internal seal lines 332 and 333 cooperate so as to define a series of relatively narrow passages 360 that separate a series of relatively wide spaces 350 inside the generally planar portion 310. One of the spaces in the pathway 300 thus defined is connected to the opening 311 which connects the reservoir portion to the generally planar portion 310.

As the dye enters the opening 311 it flows into the first end compartment 355 and fills this end compartment 355. For the dye to travel into the next compartment 356, it needs to be absorbed by the fibre lining the passage 351 connecting the two compartments 355 and 356. This travel occurs more quickly when the dye is further forced through the passage 351 because of a pressure upon the oestrus detection device, which causes more dye to be squeezed from the central reservoir portion towards the generally planar portion 310. Pressure exerted on the saturated fibre or flock layer by the mounting animal also causes the dye to spread. In a similar fashion each subsequent compartment in a generally planar portion 310 will only be filled relatively slowly unless further pressure upon the device is applied, causing more freed dye to be in the device. This arrangement of the internal seal lines 332 and 333 thereby allows for a more discrete detection for the incremental usage of the device.

Other configurations of the pathway are possible. For instance, the opening 311 can connect instead to one of the relatively narrow passages 350 defined between the internal seal lines 332 and 333.

The above device 100 is advantageous in that the dye is allowed to spread throughout the device, thereby creating a more extensive visible marker to indicate whether oestrus activity has occurred. Secondly, the dye in the incremental variations only gradually fills the generally planar portions, enabling the farmers to ascertain whether oestrus has occurred, the extent to which oestrus activity has occurred, or the vigorousness of the oestrus activity, by inspecting progress of the dye with the generally planar portions. This is advantageous, because the farmer will be able to work out the best time to organise insemination as the device will indicate, by how far or extensively spread the dye has flowed or moved out of the reservoir, as the more extensive the spread of dye is indicative of a greater degree or length time since oestrus first started. Furthermore, it is possible to implement further pathways in the generally planar portions, by manipulating the seal lines, to create more visible and discrete markers as to the extent of the oestrus activity, as shown in FIG. 3.

Other arrangements of the internal seal lines are also possible, so as to create channels of different shapes. For instance, the internal seal lines can be used to define a winding conduit through the generally planar portion. The internal seal lines can further define a single or multiple passages inside a generally planar portion. The seal lines can also be arranged so that the dye flows to one generally planar portion before proceeding to another generally planar portion in the device.

Figure 4:
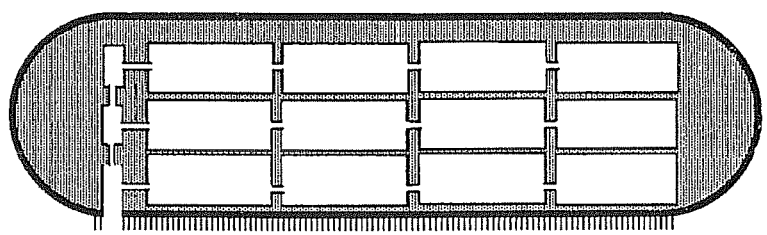
FIG. 4 is a plan view of a generally planar portion according to another embodiment of the device for detecting oestrus.
Figure 5:
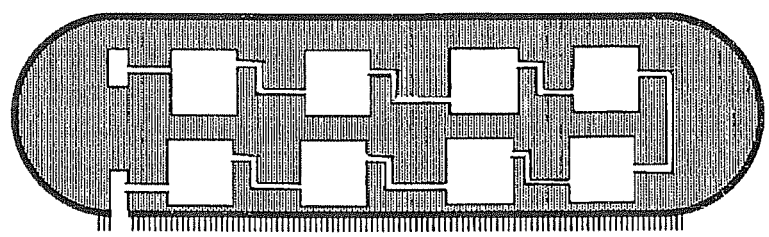
FIG. 5 is a plan view of a generally planar portion according to another embodiment of the device for detecting oestrus.

As shown in FIG. 4 the internal seal lines define multiple parallel arranged pathways. The more pathways there are, or the larger the area covered by the pathways, the more quickly the device becomes visible through the spreading of the dye. FIG. 5 depicts another example of a sequential pathway made up of discrete relatively large spaces connected by narrow passages, that are defined by the internal seal lines or internal seal pattern.

As shown in FIG. 6, the dye pathway can also be defined by, e.g. stamping. For example, a text or graphic can be stamped into the generally planar portion, allowing the dye to flow around the stamped text or graphic.

The internal seal lines can define a winding conduit which spells out, for instance, a graphic or a text such as a logo for the device, as shown in FIG. 7 which has parallel connected letters, and FIG. 8 which has sequentially connected letters. The text becomes visible when the dye enters the planar portions.

Figure 9:
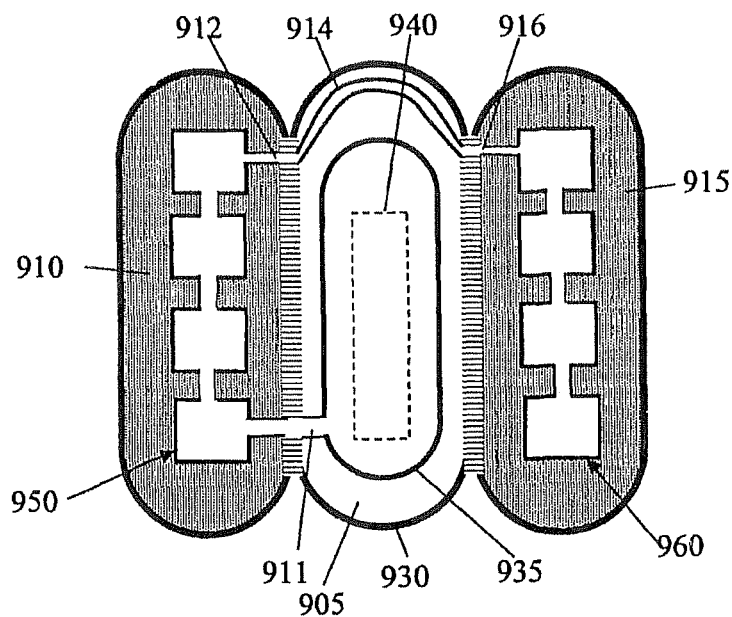
FIG. 9 is a plan view of a further embodiment of the oestrus detector; where the dye travels to the generally planar portions in sequence.

As shown in FIG. 9, the dye can alternatively fill the generally planar portions 910, 915 sequentially, rather than simultaneously, from central portion 905. From the vial 940, the dye can flow out of the reservoir portion 935 via a first opening 911 into the internal passage 950 of one planar portion 910. Once the dye reaches the end of the passage 950, it re-enters the central portion 905 from the passage 950 via opening 912 which leads into a pathway 914 located in the central portion 905. The pathway 914 in the reservoir portion 935 is not in communication with the periphery of the central portion 905, and the dye must travel through the first passage 950 before it can reach this pathway 914. The pathway 914 then leads to opening 916, via which it communicates with the passage 960 inside the other planar portion 915.

Figure 10:
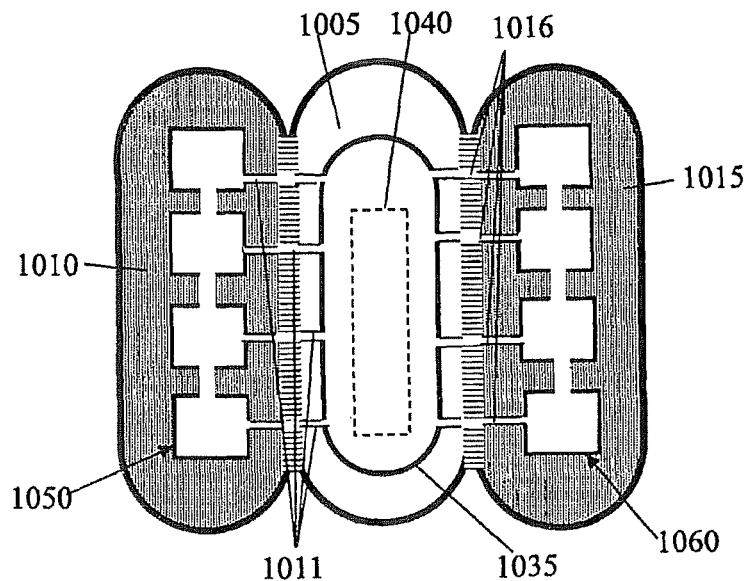
FIG. 10 is a plan view of an embodiment of the oestrus detector; where the dye travels to the generally planar portions generally simultaneously.
Figure 11:
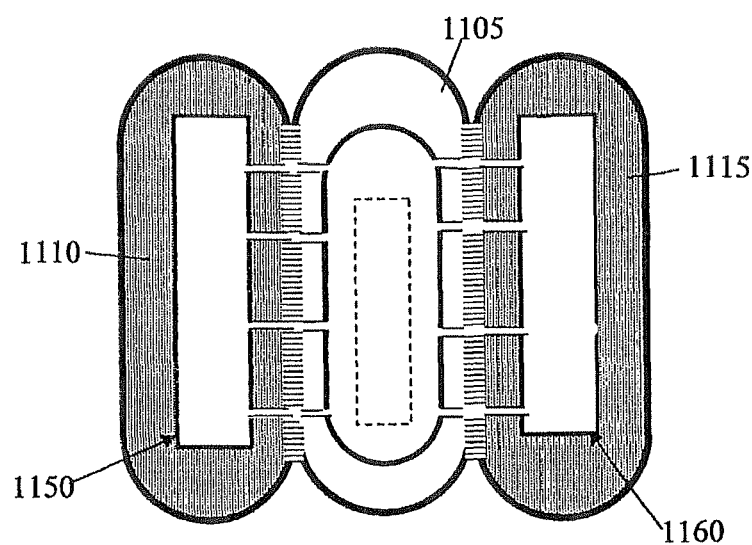
FIG. 11 is a plan view of another embodiment of the oestrus detector; where the dye travels to the generally planar portions generally simultaneously.

FIGS. 10 and 11 show examples where the dye fills the generally planar portions simultaneously. As shown in FIG. 10, once the dye is squeezed out of the vial 1040 in the reservoir portion 1035 in central portion 1005, it can travel to the generally planar portions 1010 and 1015, from the central portion 1005 at generally the same time, unless an uneven pressure has been applied to squeeze the dye toward one side more than the other, through openings 1011 and 1016 that lead to the compartments in the passages 1050 and 1060. FIG. 11 depicts another embodiment where the dye enters the planar portions 1115 and 1110, from the central portion 1105 at roughly the same time, and the portions 1110 and 1115 respectively have internal fill spaces 1150 and 1160.

Figure 12:
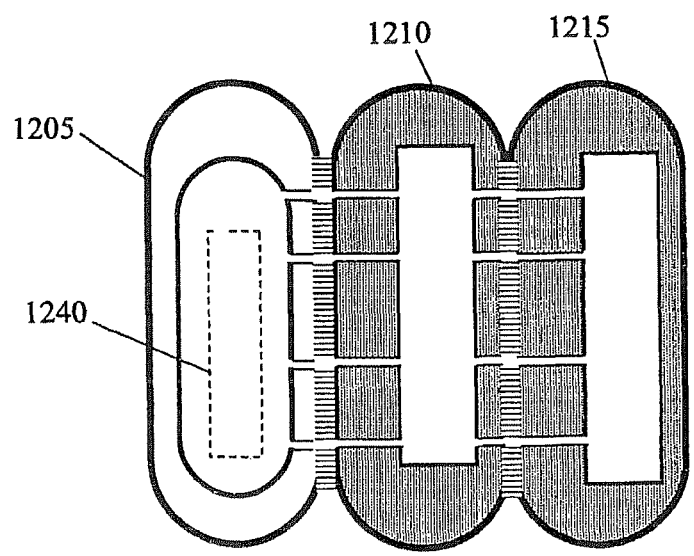
FIG. 12 is a plan view of another embodiment of the oestrus detector; where the dye travels to the generally planar portions in sequence.
Figure 13:
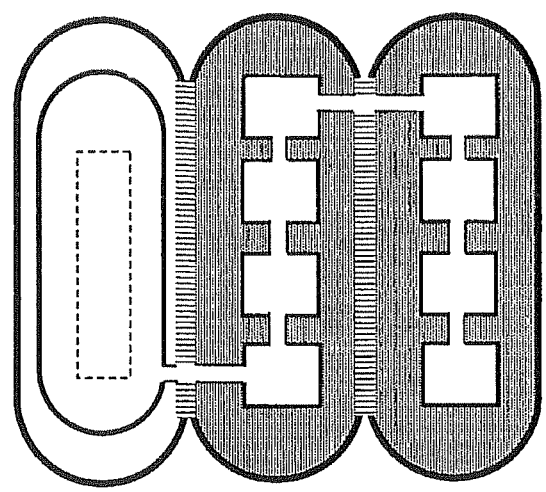
FIG. 13 is a plan view of a further embodiment of the oestrus detector; where the dye vial containing portion is not centrally located.
Figure 14:
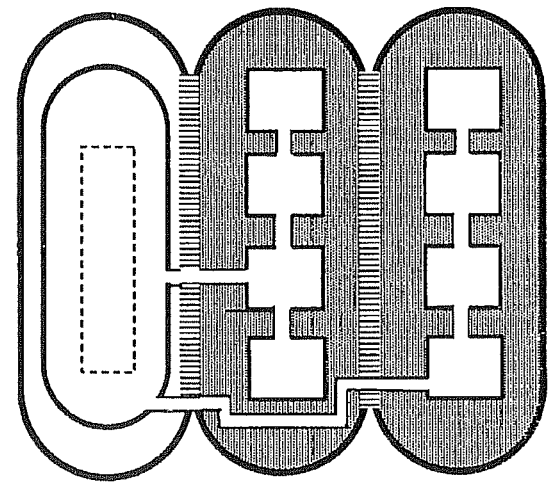
FIG. 14 is a plan view of another embodiment of the oestrus detector; where the dye vial containing portion is not centrally located.
Figure 15:
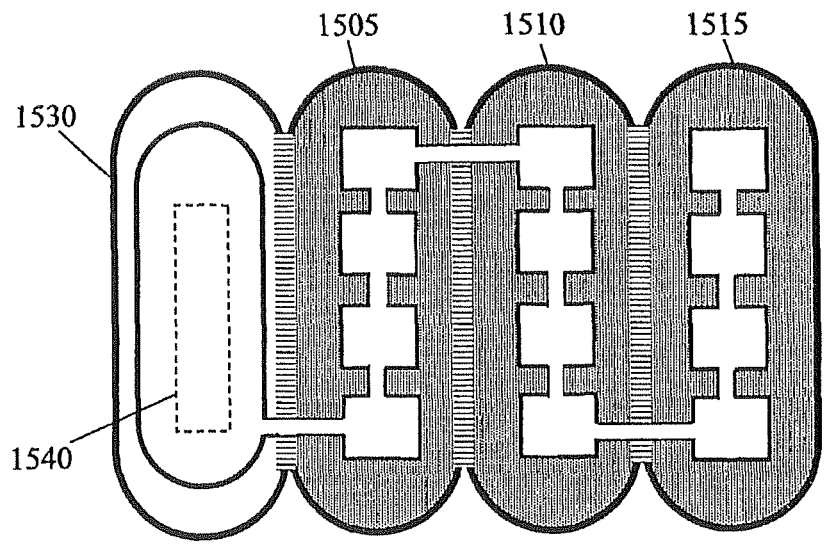
FIG. 15 is a plan view of an embodiment of the oestrus detector having three generally planar portions.

In the above, the reservoir portion is located in a 'central' portion. However, the portion which includes the dye reservoir portion can instead be located on a side portion of the device, as shown in FIG. 12. This is as long as the dye reservoir portion containing portion 1205 can still receive sufficient pressure during mounting activity, so that dye can be squeezed out of the dye vial 1240, and then enter the planar portions 1210 and 1215 in sequence. FIGS. 13 and 14 show further examples of this type.

Figure 16:
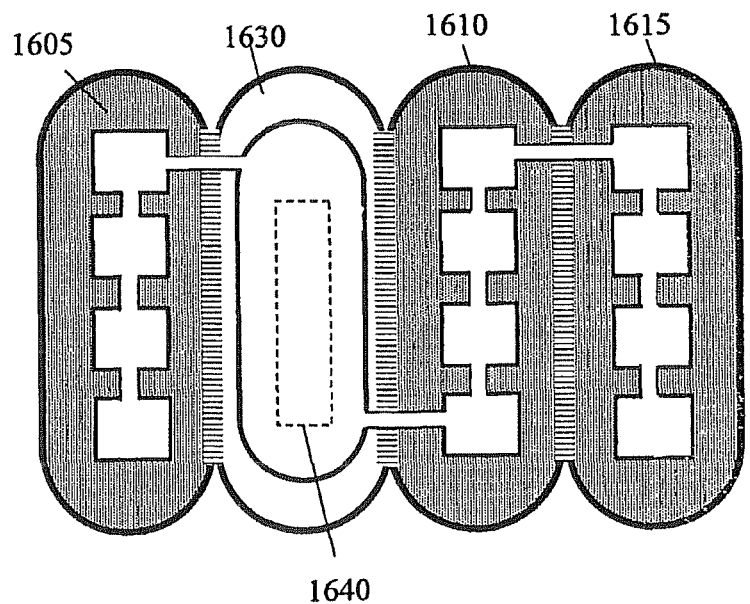
FIG. 16 is a plan view of an embodiment of the oestrus detector having three generally planar portions.
Figure 17:
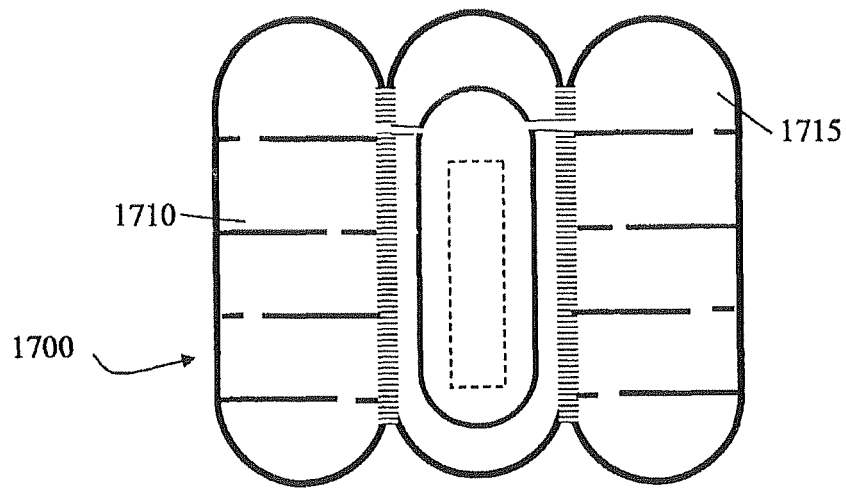
FIG. 17 is a plan view of another embodiment of the oestrus detector having two generally planar portions.
Figure 18:
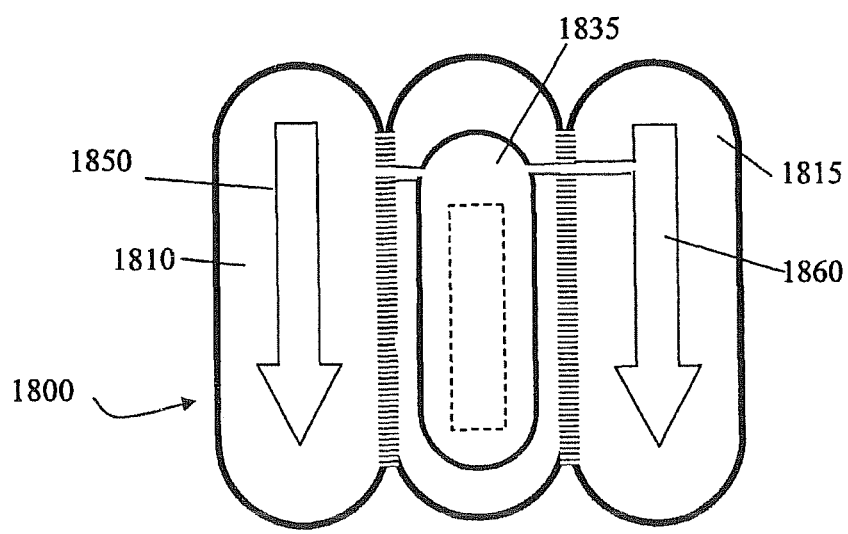
FIG. 18 is a plan view of another embodiment of the oestrus detector having two generally planar portions, where internal seal lines in the generally planar portions define arrows which suggest a direction for attaching the detector on an animal.

The device can have one, two, or more generally planar portions. For example, the device shown in FIG. 15 includes three generally planar portions 1505, 1510, and 1515 that are arranged to one side of the dye vial containing portion 1530 that holds the dye vial 1540. As shown in FIG. 16, the device can have a dye vial containing portion 1630 that holds the dye vial 1640 and generally planar portions 1605, 1610, 1615 on both sides, but without the dye vial containing portion 1630 being located in the centre. FIG. 17 shows another example of a device 1700 where the generally planar portions 1710 and 1715 have another internal seal line pattern. FIG. 18 shows an oestrus detector 1800 where the internal seal line pattern in the generally planar portions 1810 and 1815 show in the arrows 1850 and 1860 which suggest a direction of attachment for the device. For instance arrows point toward the head of the animal. Upon application of pressure to which causes the dye to exit the reservoir portion 1835, the dye can fill the space around the arrow 1850 or fill the space within the arrow 1860.

Further combinations of the above can be used. For instance, if the device has two or more generally planar portions, the generally planar portions can have internal seal lines that define different internal passages.

Figure 19:
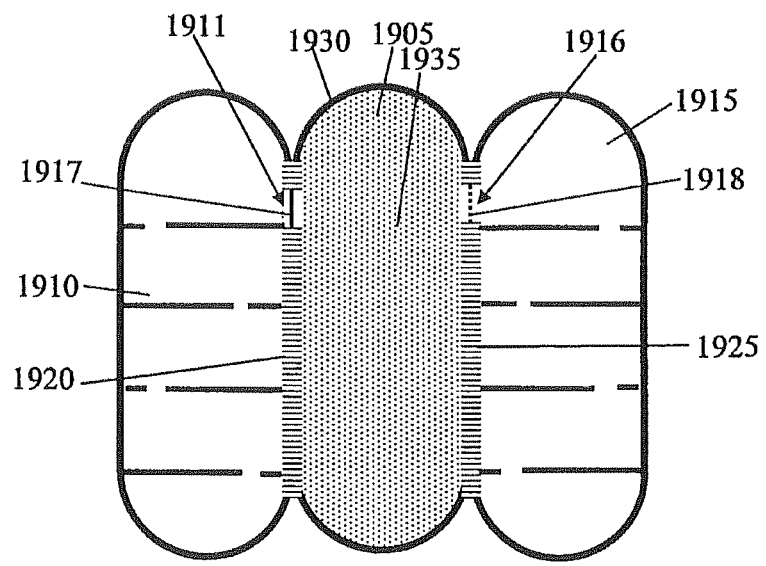
FIG. 19 is a plan view of an embodiment of the oestrus detector where the reservoir portion directly holds the dye.

The dye can be contained directly by the perimeter 1930 of the detector and the seal lines 1920 and 1925. The 'central portion' 1905 defined by these lines therefore acts as the reservoir portion 1935 and holds the liquid. For instance the embodiment shown in FIG. 19 includes no vial. The passages 1911 and 1916 are each temporarily closed by a valve 1917 or a frangible means such as a frangible membrane or a weak seal 1918. On the application of a pressure upon the reservoir portion 1935, the pressure causes the valve 1917 to be opened or the frangible means 1918 to be broken. The pressure then causes the dye to exit the reservoir portion 1935 via the passages 1911 and 1916, and enter the generally planar portions 1910 and 1915.

Figure 20:
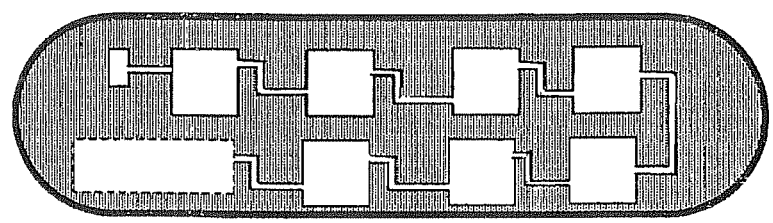
FIG. 20 is a plan view of an embodiment of an oestrus detector where the detector comprises a single planar portion.

Illustrated in FIG. 20 is a single obround planar portion wherein in part thereof is a reservoir of dye or liquid, and a single snaking or incremental flow path made up of discrete wide spaces or portions connected by narrow passages, is provided whereby pressure applied to the reservoir will cause liquid or dye to flow in the flow path such that prolonged pressure or repeated application of pressure such as from oestrus activity will cause the dye or liquid to flow more extensively in the flow path.

While the above description utilises a liquid as a flowable substance it will be understood that other substances will be suitable including gels, pastes, jellies, creams, slurries, liquids of high, medium or low viscosity, flowable powders etc, and mixtures or combinations of these.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. An oestrus detector, comprising:
    a reservoir portion which contains a flowable substance;
    at least one indicator portion, the indicator portion comprising a flow path having a plurality of compartments configured to receive the flowable substance in a sequence, the plurality of compartments being connected by a plurality of passages, each of the plurality of passages being narrower than the compartments; and
    a first passage from the reservoir portion to the flow path,
    wherein the flowable substance is operative to pass from the reservoir portion to the flow path through the first passage in response to pressure applied to the reservoir portion, and
    wherein the flowable substance is further operative to gradually spread through the plurality of compartments of the flow path in response to prolonged or further pressure applied to the reservoir portion.

2. An oestrus detector as claimed in claim 1, wherein the at least one indicator portion comprises a plurality of indicator portions.

3. An oestrus detector as claimed in claim 2, wherein the plurality of indicator portions are located on opposite sides of the reservoir portion.

4. An oestrus detector as claimed in claim 1, wherein the reservoir portion and at least one of the at least one indicator portion and at least a portion of the plurality of compartments are separated by seal lines.

5. An oestrus detector as claimed in claim 1, wherein the first passage is closed by a valve means that is openable by pressure, or closed by a frangible means that can be broken by pressure.

6. An oestrus detector as claimed in claim 1, further comprising a vial for holding the flowable substance within the reservoir portion, the vial closed by a valve which the flowable substance passes through when pressure is applied.

7. An oestrus detector as claimed in one claim 6, wherein the first passage is located near or at an end of the reservoir portion so as to be away from the valve.

8. An oestrus detector as claimed in claim 1, further comprising a second passage from the reservoir portion to the flowpath, wherein the first passage and the second passage are both located on or near one end of the reservoir portion.

9. An oestrus detector as claimed in claim 1, wherein the at least one indicator portion includes at least one internal seal line.

10. An oestrus detector as claimed in claim 1, wherein an internal surface of the flow path is lined by a fibrous material comprising at least one of:
    a synthetic short fiber material,
    a hydrophobic material, and
    a hydrophilic material.

11. An oestrus detector as claimed in claim 1, wherein in a first configuration the presence of the flowable substance is visible in the indicator portion, and in a second configuration the flowable substance causes a material contained in the indicator portion to change color via a physical or a chemical reaction.

12. An oestrus detector as claimed in claim 1, wherein the flow path forms a winding pathway for the flowable substance inside the at least one indicator portion.

13. An oestrus detector as claimed in claim 1, wherein the first passage is narrower than the reservoir portion.

14. An oestrus detector, comprising:
    a reservoir portion which contains a flowable substance; and
    at least one indicator portion, the at least one indicator portion comprising a plurality of compartments configured to receive the flowable substance; and
    wherein the flowable substance is operative to pass along at least one flow path between the reservoir portion and the plurality of compartments in response to pressure applied to the reservoir portion, and
    wherein the flowable substance is further operative to gradually spread through the at least one flow path to each of the plurality of compartments in response to prolonged or further pressure applied to the reservoir portion.

15. An oestrus detector as claimed in claim 14, comprising a plurality of indicator portions, and wherein the plurality of compartments comprises at least one compartment in each of the plurality of indicator portions.

16. An oestrus detector as claimed in claim 14, wherein the at least one flow path comprises a plurality of compartments, and wherein the compartments are separated by at least one passage adapted to restrict the flow of the flowable substance.

17. An oestrus detector as claimed in claim 14, further comprising a plurality of flow paths, wherein each flow path comprises at least one passage from the reservoir to at least one of the plurality compartments.

18. An oestrus detector as claimed in claim 14, wherein the reservoir portion and at least one of the at least one indicator portion and at least a portion of the plurality of compartments are separated by seal lines.

19. An oestrus detector as claimed in claim 14, further comprising a plurality of flow paths, each flow path extending from the reservoir to one of the plurality of compartments.

20. An oestrus detector as claimed in claim 14, wherein in a first configuration the flowable substance is visible in the at least one indicator portion, and in a second configuration the flowable substance causes a material contained in said indicator portion to change colour via a physical or a chemical reaction.

21. An oestrus detector as claimed in claim 1, wherein the at least one indicator portion comprises a material adapted to absorb the flowable substance, and wherein the absorption of the flowable substance facilitates the gradual spreading of the flowable substance in response to prolonged or further pressure being applied to at least one of the reservoir portion and the at least one indicator portion.

22. An oestrus detector as claimed in claim 14, wherein the at least one indicator portion comprises a material adapted to absorb the flowable substance, and wherein the absorption of the flowable substance facilitates the gradual spreading of the flowable substance in response to prolonged or further pressure being applied to at least one of the reservoir portion and the at least one indicator portion.

\* \* \* \* \*